(12) United States Patent
Cas et al.

(10) Patent No.: US 8,254,225 B2
(45) Date of Patent: *Aug. 28, 2012

(54) METHOD OF WRITING DATA TO A DISC, DISC DRIVE

(75) Inventors: Marc Angeline Jozef Cas, Brasschaat (BE); Johannes Franciscus Petrus Claas, Valkenswaard (NL); Stefan Geusens, Houthalen-Helchteren (BE)

(73) Assignee: Lite-On It Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/326,578

(22) Filed: Dec. 15, 2011

(65) Prior Publication Data

US 2012/0087223 A1 Apr. 12, 2012

Related U.S. Application Data

(62) Division of application No. 12/165,117, filed on Jun. 30, 2008, now Pat. No. 8,154,963.

(51) Int. Cl.
*G11B 27/00* (2006.01)

(52) U.S. Cl. ............... 369/47.13; 369/47.55; 369/53.36; 369/53.37

(58) Field of Classification Search .................. None
See application file for complete search history.

(56) References Cited

U.S. PATENT DOCUMENTS

| | | |
|---|---|---|
| 2006/0013095 A1 | 1/2006 | Liu et al. |
| 2006/0140068 A1 | 6/2006 | Urata et al. |
| 2008/0159094 A1 | 7/2008 | Lin |
| 2008/0267027 A1 | 10/2008 | Zhong et al. |

*Primary Examiner* — Wayne Young
*Assistant Examiner* — Brian Butcher
(74) *Attorney, Agent, or Firm* — WPAT., P.C.; Justin King

(57) ABSTRACT

The invention relates to a method of writing data to a disc (OD). The method comprised: a) performing a plurality of writing actions in which a plurality of data portions are written to the disc, b) performing a plurality of verification actions in which written data portions are at least partly verified and at least part of the data portions are replaced if needed. The method further comprises a2) performing a decision action for each writing action in which a decision whether or not to perform the verification action for a specific written data portion is taken.

2 Claims, 7 Drawing Sheets

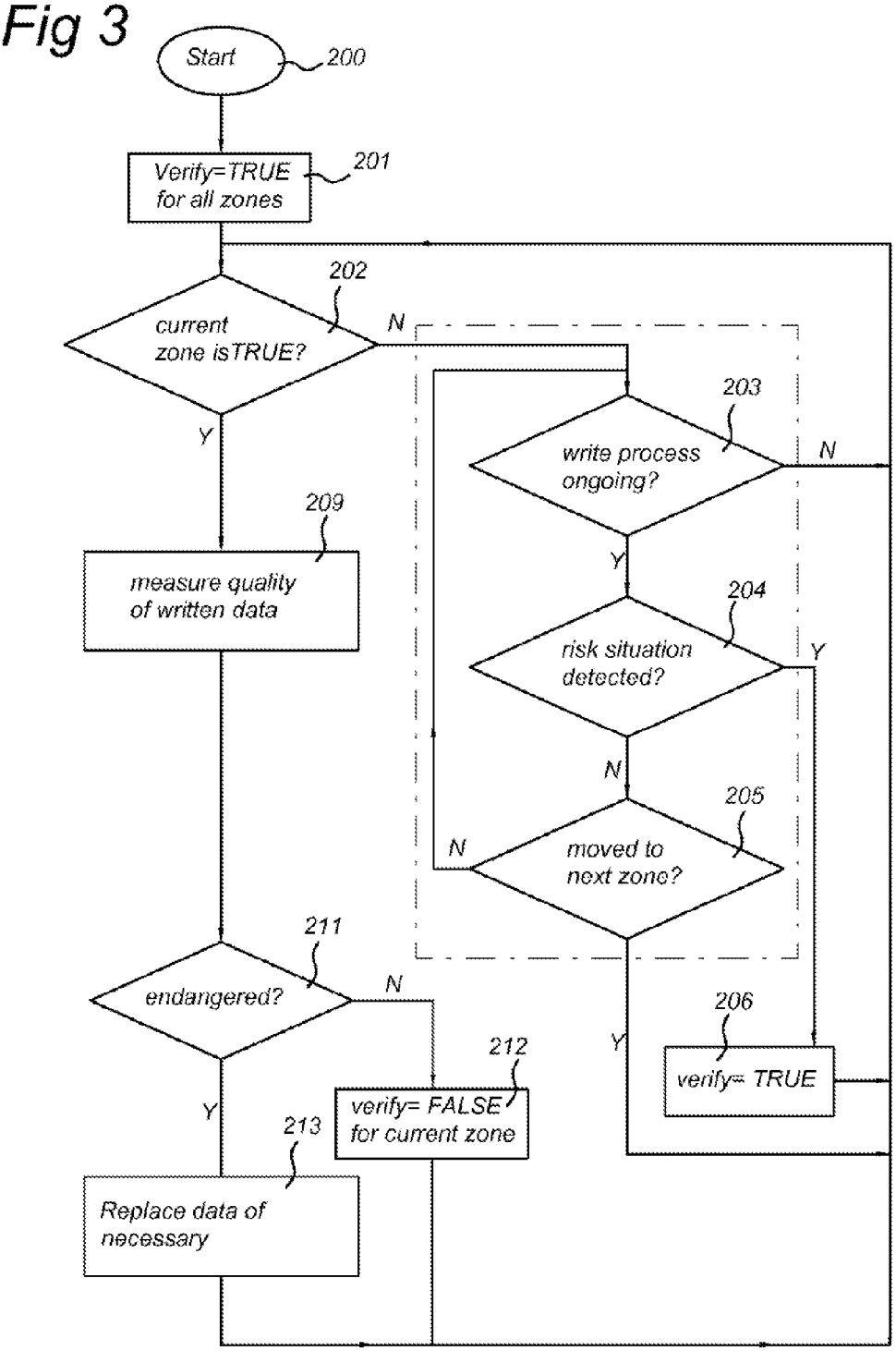

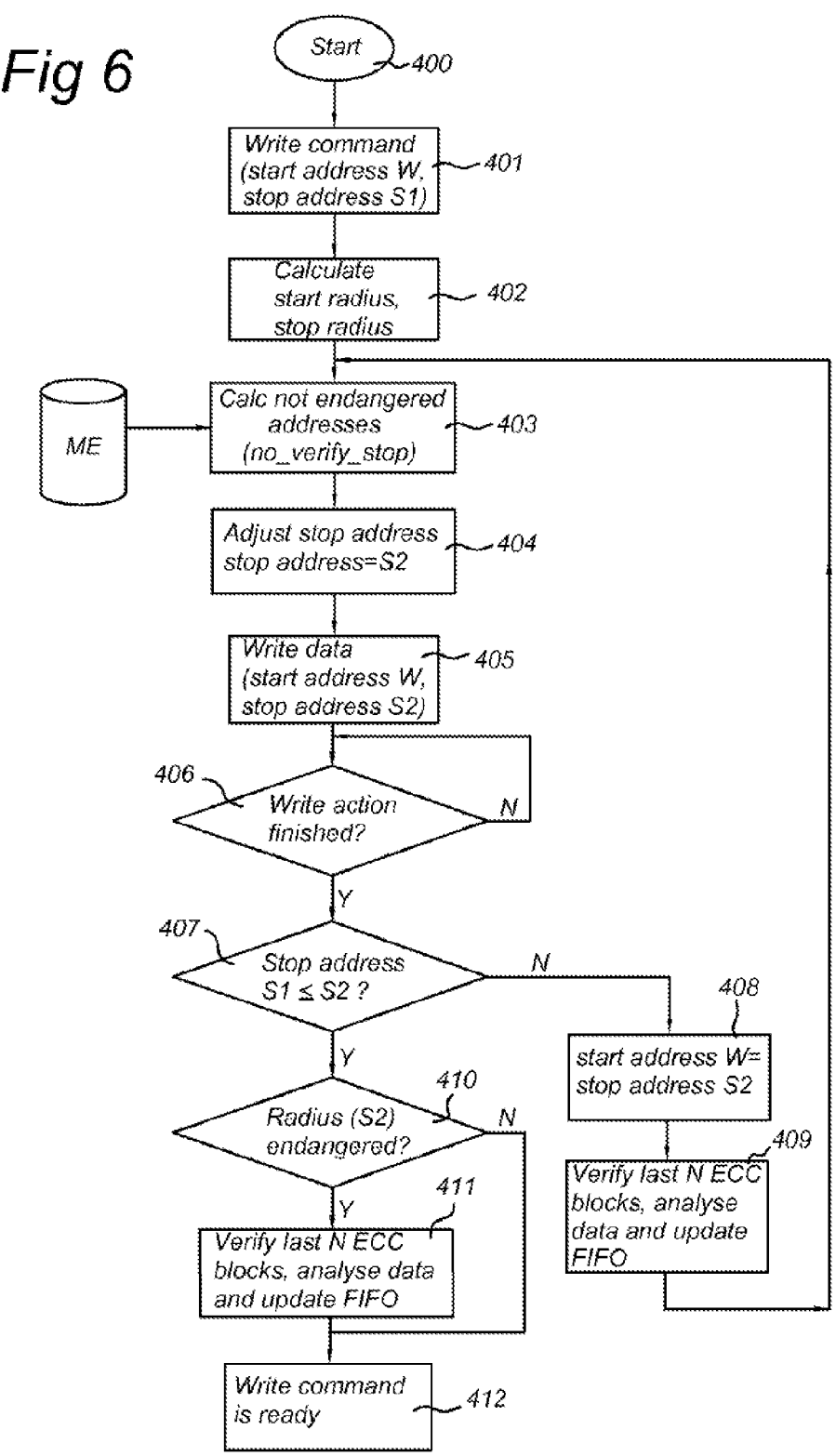

METHOD OF WRITING DATA TO A DISC, DISC DRIVE

CROSS-REFERENCE TO RELATED APPLICATIONS

Figure 1:
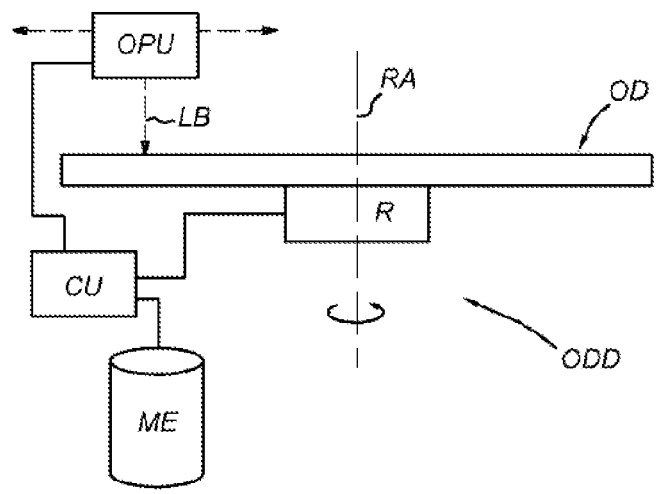

This application is a divisional of U.S. application Ser. No. 12/165,117 filed Jun. 30, 2008 and entitled "METHOD OF WRITING DATA TO A DISC, DISC DRIVE", the entire contents of which are incorporated herein by reference.

The present application claims the 35 U.S.C. §120 benefit of prior copending U.S. Pat. No. 7,876,651 filed Aug. 28, 2007, which is incorporated herein by reference.

TECHNICAL FIELD

The invention relates to a method of writing data to a disc, a disc drive, a computer program, and a data carrier.

STATE OF THE ART

In an optical disc drive, data can be written on optical disc media (such as a CD, DVD, Blu ray Disc (BD), HD DVD, DVD-RAM . . . ) from now on also referred to as optical disc or disc. To read or write data from/to the disc a laser-based optical pick-up unit (OPU) may be used. This optical pick-up unit (OPU) may be arranged to generate a laser beam and to scan the laser beam over the surface of the disc to read from or write data to the disc.

The optical disc is composed of several layers, at least comprising two functional layers. A first layer is an information layer, which comprises the data or on which data can be written. A second layer is a protection layer. This protection layer is basically a substrate, which separates and therefore also protects the information layer from the outside world. The laser beam of the optical pick-up unit OPU will pass through this protective substrate to read data from or write data to the information layer of the disc.

The optical disc may be placed in the optical disc drive and forms an interchangeable and cheap data storage medium.

Optical disc media are produced worldwide by numerous manufacturers. Because of this mass production, the quality of an optical disc may vary. Although the disc has to meet strict specifications, the optical disc drive manufacturer has no control on the quality of the optical discs.

Also, the data present on the disc is only protected by the protection layer. No additional protection (for example a cartridge) is used to protect the protection layer. A damaged protection layer (e.g.: dust or scratches) can make it difficult or even impossible for the optical storage drive to write or read data from the disc. Because of the production spread and handling of the optical disc, the process of writing data to the information layer may not be completely reliable.

A common way to solve or significantly decrease these problems is to read back the data that has just been written and compare the read data with the original data and replace erroneous or unreliable data to a different location. This approach is also referred to as "verify after write" functionality. For instance, for writable BD discs, replacement areas are specified in the BD disc format together with a defect manager to handle the replaced data.

Instead of or in addition to reading back and comparing the written data, the written data may be verified by performing certain quality requirements, such as checking error statistics, jitter etc.

In general, the written data may be verified, where verifying may be any kind of quality measurement of the written data. To ensure data integrity, optical disc drives have a mode to write data to a disc and immediately verify the written data. If the written data is not reliable enough, the data is replaced to a replacement area.

So, to increase the integrity of the written data the "verify after write" functionality may be enabled. However, this "verify after write" functionality reduces the effective writing speed performance of the optical disc drive. To show this reduction of the effective writing speed performance due to the "verify after write" functionality, a simple calculation example is presented.

EXAMPLE

Assume that the record and read speed=2 times the reference speed of BD and the "verify after write" procedure includes: writing 30 ECC blocks, verifying 30 ECC blocks, etc. (ECC error correction code) Further assume that the overhead times during write and verify action equals 150 ms (time to stop write process, time to jump back to the beginning of the written ECC blocks, time to jump back to be beginning of the next ECC block to be written, time to go back to write process). This overhead time is almost independent of the read and write speed. The time that is needed to read or write 1 ECC block at reference speed is about 14.6 ms.

Thus, the time needed to write 30 ECC blocks can be calculated: Without verifying the data:

$$\frac{14.6}{2} \times 30 = 219 \, \text{ms}$$

(writing process is not stopped). With verifying the data: 219+219+150=588 ms (=write time+read time+overhead time) Based on this calculation it can be seen that the effective write speed when enabling the "verify after write" functionality drops from 2× to $$2 \times \frac{219}{588} = 0.75X$$

writing speed.

For higher writing speeds the overhead times will become dominant and the performance drop will be relatively much higher. Doing the same calculation with 12× writing and 12× read speed shows that the performance will drop from 12× to an effective writing speed of 2×.

A way to improve the performance of the "verify after write" functionality is to add a large and expensive memory to the drive, so larger number of ECC blocks can be written at once. However, this also results in additional costs and the improvement of the performance will be relatively small for higher writing speeds.

Furthermore, as a result of the "verify after write" functionality, the optical disc drive needs more time and actions to write a disc. This will decrease the lifetime of the drive.

U.S. Pat. No. 7,283,442 describes a method for choosing between two modes of writing data, i.e. a write detection or write verification mode, where the choice is made based on a detected number of defects.

It is an object of the invention to enable data to be written with a relatively high performance.

SUMMARY OF THE INVENTION

According to an aspect there is provided a method of writing data to a disc, the method comprising:

a) performing a plurality of writing actions in which a plurality of data portions are written to the disc, b) performing a plurality of verification actions in which written data portions are at least partly verified and at least part of the data portions are replaced if needed, wherein the method further comprises a2) performing a decision action for each writing action in which a decision whether or not to perform the verification action for a specific written data portion is taken. It will be understood that these actions may be performed in any suitable order.

According to an embodiment there is provided a method wherein the method comprises:

a) performing a writing action in which a data portion is written to the disc, a2) performing decision action to decide to perform the verification action or not for the data portion, and successively b) performing verification action or not based on decision action, and repeating a), a2) and b) for a further data portion.

According to an embodiment there is provided a method wherein the method comprises:

a) performing a writing action in which a data portion is written to the disc, a2) performing decision action to decide to perform the verification action or not for the data portion, and successively repeating a) and a2) for a plurality of further data portions, and b) performing verification actions or not based on decision actions.

According to an embodiment there is provided a method wherein a plurality of zones is defined on the disc and the decision action comprises:

checking if verification action has already been performed for previously written data for the same zone as the data portion and deciding not to perform the verification action if replacement of the previously written data was not necessary.

According to an embodiment there is provided a method wherein a plurality of zones is defined on the disc and the decision action comprises:

checking if verification action has already been performed for previously written data for the same zone as the first data portion and deciding not to perform the verification action if the previously written data does meet some predetermined quality requirements.

According to an embodiment there is provided a method wherein the predetermined quality requirements comprise a margin for the written data.

According to an embodiment there is provided a method wherein the verification action for the data portion is only not performed if the verification action was already performed for previously written data for the same zone as the first data portion within a predetermined time interval from performing the write action for the data portion.

According to an embodiment there is provided a method wherein the decision action comprises using information previously collected by performing a pre-scan of at least part of the disc.

According to an embodiment there is provided a method wherein the method further comprises performing the pre-scan before performing writing action.

According to an embodiment there is provided a method wherein a plurality of zones is defined on the disc and the pre-scan was performed for at least part of each zone.

According to an embodiment there is provided a method wherein the decision action comprises performing a monitor function.

According to an embodiment there is provided a method wherein the monitor function comprises monitoring at least one of a tracking error signal or a focus error signal.

According to an embodiment there is provided a method wherein the monitor function comprises monitoring shocks.

According to an embodiment there is provided a method wherein the monitor function comprises monitoring disc errors.

According to an embodiment there is provided a method wherein the monitor function comprises monitoring a temperature.

According to an embodiment there is provided a method wherein the decision action comprises checking if verification action has already been performed for previously written data within a predetermined distance from the position on the disc where the data portion is to be written, and not perform the verification action if no replacement was necessary of the previously written data.

According to an embodiment there is provided a method wherein the decision action comprises checking if verification action has already been performed for previously written data within a predetermined distance from the position on the disc where the first data portion is to be written, and deciding to not perform verification action if the previously written data does meet some predetermined quality requirements.

According to an embodiment there is provided a method wherein the predetermined quality requirements comprise a margin for the written data.

According to an embodiment there is provided a method wherein the decision action comprises checking if the data portion is to be written on a certain location on the optical disc.

According to an embodiment there is provided a method wherein the decision action comprises checking if the data portion is of a certain type.

According to an embodiment there is provided a method wherein the verification action comprises at least one of:

reading at least part of the data portion that is written to the disc and compare it to data portion that was to be written, perform a quality measurement of the data portion that is written to the disc and compare it to predetermined quality requirements.

According to an embodiment there is provided a method, wherein the decision action comprises a DOW-analysing action.

According to an embodiment there is provided a method wherein the DOW analysing action comprises performing a first test write action to write a first test data portion on an area on the disc that has not been written before determine test quality of the written first test data portion, performing a second test write action to write a second test data portion overwriting the first test data portion determine test quality of the written second test data portion, determine test difference between determined test qualities, wherein the decision action decides to perform the verification action is the test difference is above a predetermined threshold.

According to an embodiment there is provided a method wherein the DOW-analyzing action comprises performing a scan of at least parts of the optical disc to determine quality of data previously written to the optical disc, compute difference between determined qualities, the decision action decides to perform the verification action is the difference is above a predetermined threshold.

According to an aspect there is provided a disc drive arranged to receive a disc, the disc drive comprising an optical pick-up unit, arranged to generate a beam to be scanned over the surface of the disc to read data from or write data to the disc, the disc drive arranged to a) perform a plurality of writing actions in which a plurality of data portions are written to the disc, b) perform a plurality of verification actions in which written data portions are at least partly verified and at least part of the data portions are replaced if needed, wherein the disc drive further is arranged to a2) perform a decision action for each writing action in which a decision whether or not to perform the verification action for a specific written data portion is taken.

The disc drive may be arranged to perform any one of the above mentioned methods.

According to an aspect there is provided a computer program, when loaded on a computer arrangement, is arranged to perform any one of the methods according the above.

According to an aspect there is provided a data carrier, comprising such a computer program.

SHORT DESCRIPTION OF THE DRAWINGS

Figure 2A:
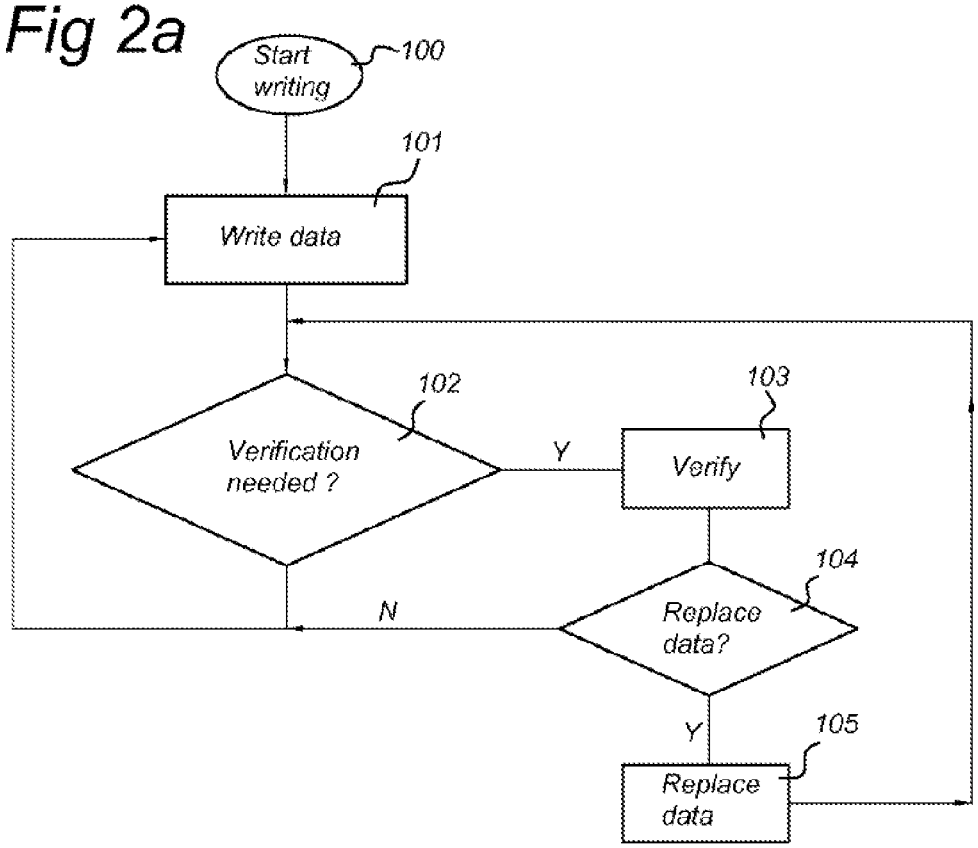
Figure 2B:
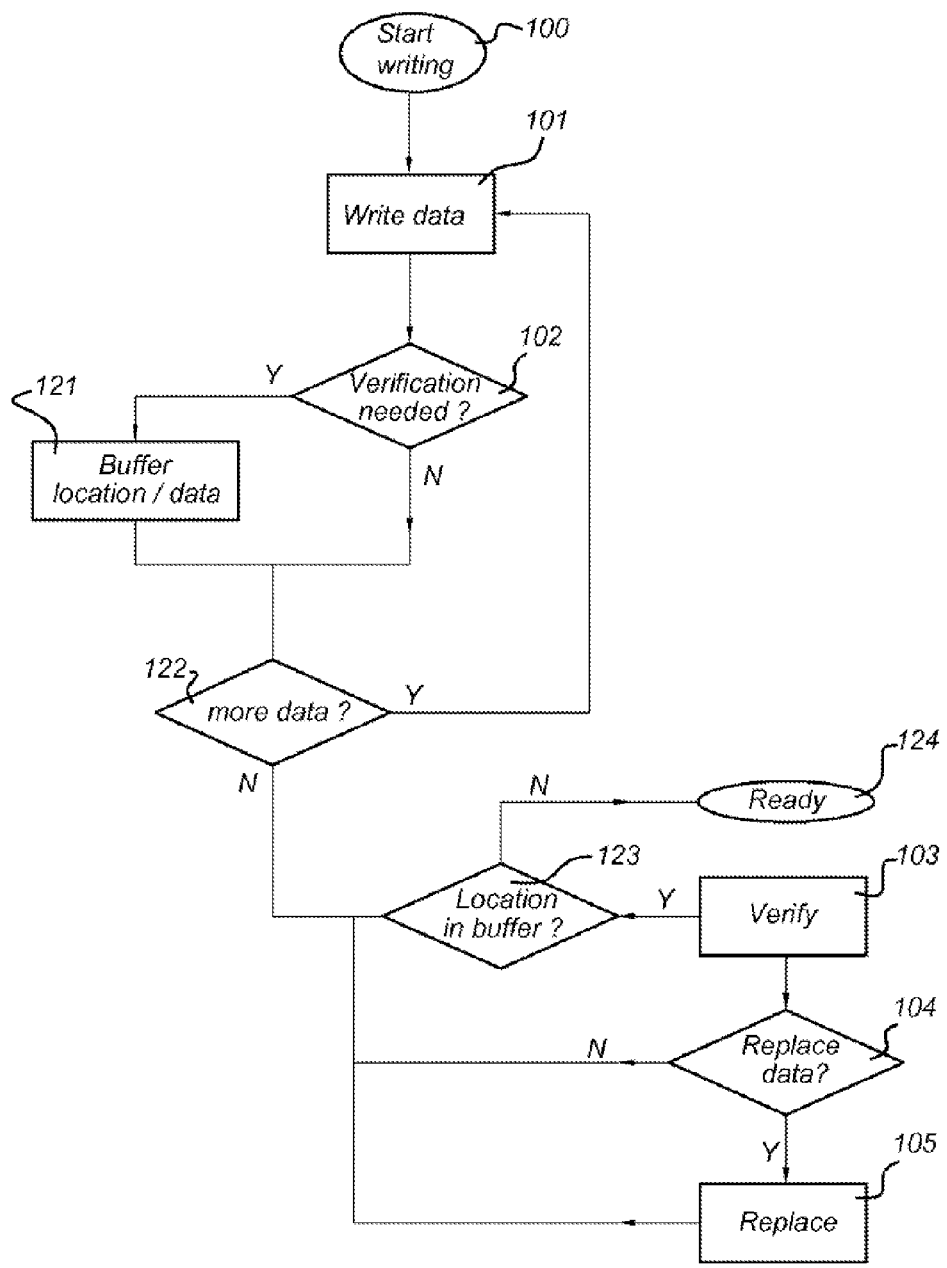
Figure 4:
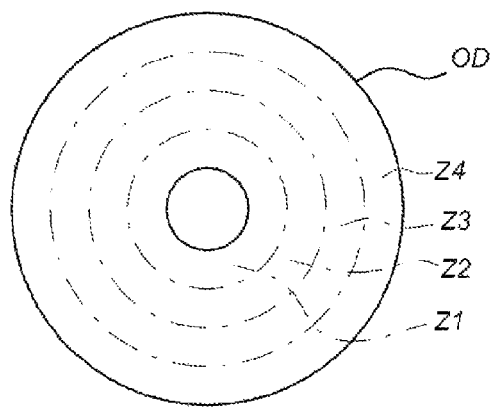
Figure 5:
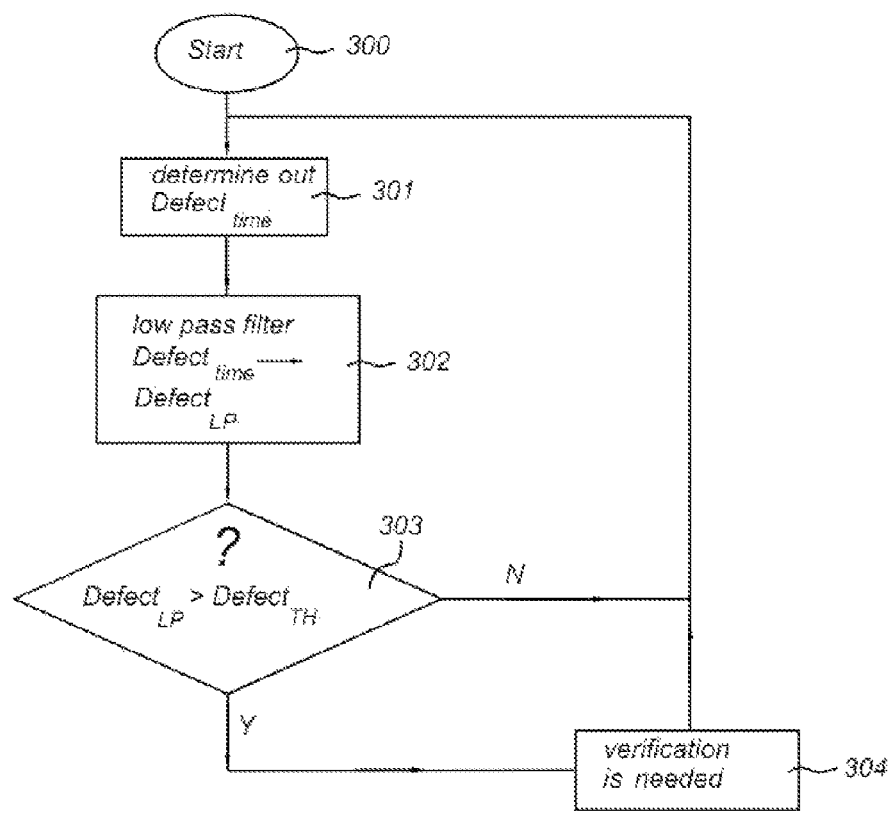

Embodiments of the invention will now be described, by way of example only, with reference to the accompanying schematic drawings in which corresponding reference symbols indicate corresponding parts, and in which:

FIG. 1 schematically depicts a cross sectional view of an optical disc drive comprising an optical disc, FIGS. 2a, 2b and 3 schematically depict a flow diagram according to an embodiment, FIG. 4 schematically depicts a top view of an optical disc, FIG. 5 schematically depicts a flow diagram according to an embodiment.

Figure 7A:
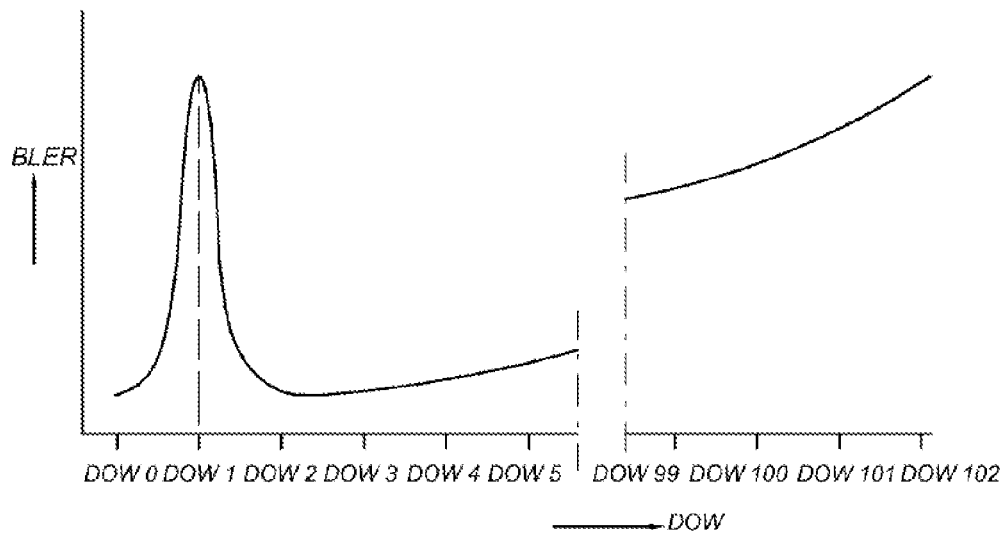
Figure 7B:
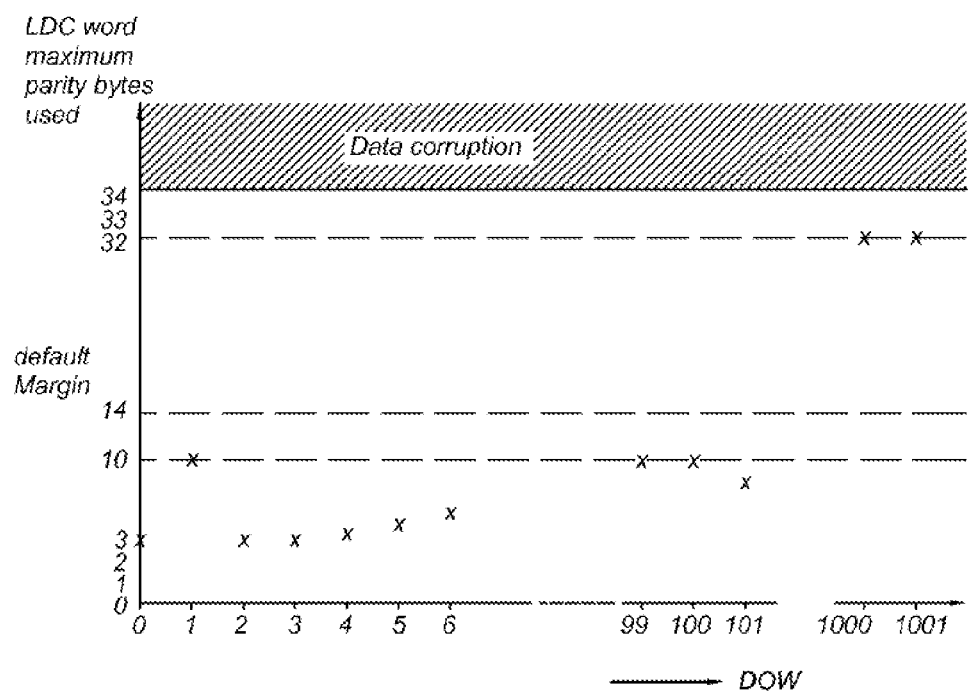
Figure 8:
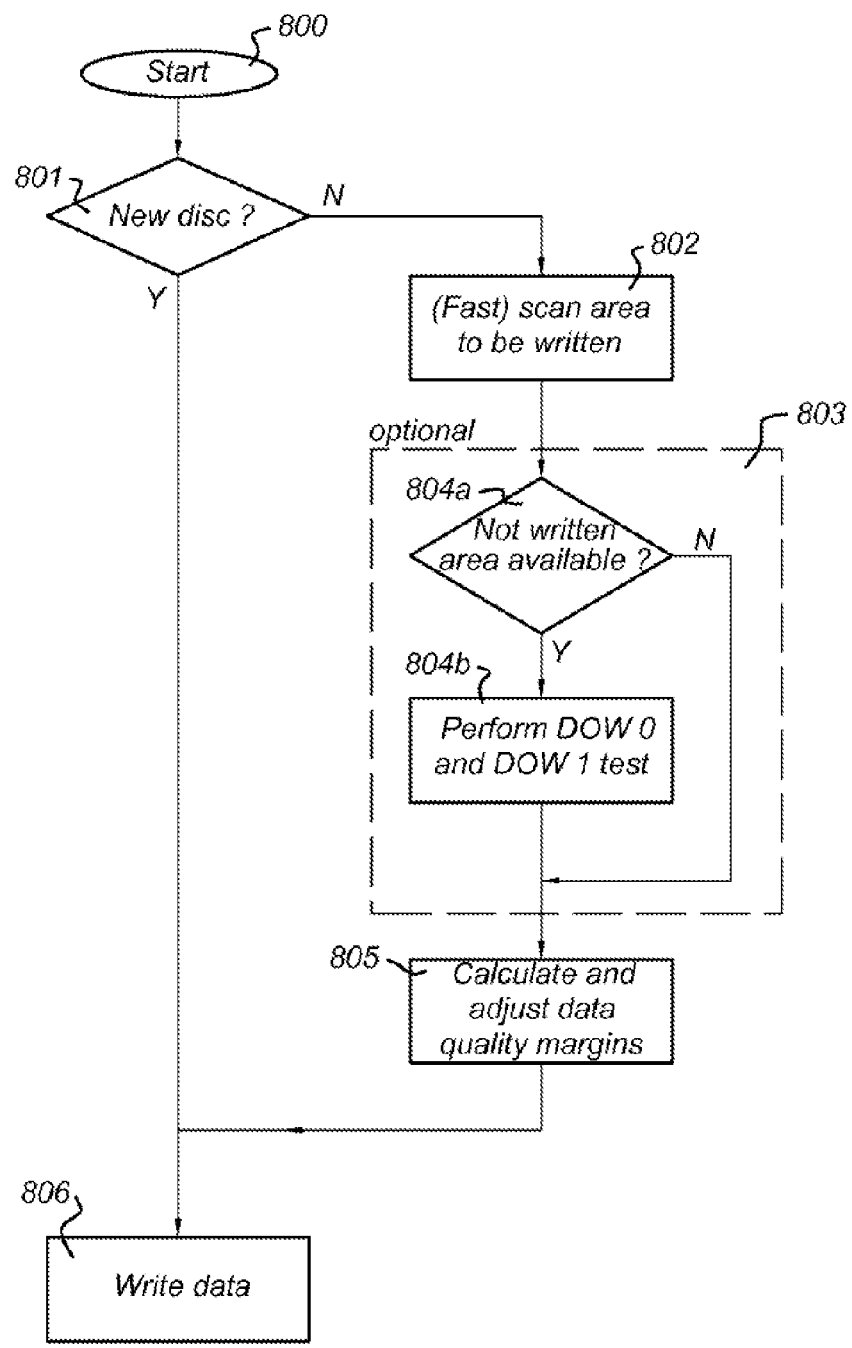

FIG. 6 schematically depicts a flow diagram according to an embodiment. Same reference numbers used in different figures refer to similar components, FIGS. 7a and 7b schematically depicts DOW-curves, and FIG. 8 schematically depicts a flow diagram according to an embodiment.

DETAILED DESCRIPTION

FIG. 1 schematically depicts an optical disc drive ODD with an optical disc OD, such as a CD, DVD, Blu ray Disc (BD), HD DVD etc. The optical disc OD is usually substantially disc shaped, i.e. substantially round with a hole in the middle to allow the optical disc drive ODD to receive and actuate (rotate) the optical disc OD.

The optical disc drive ODD comprises an optical pick-up unit OPU, arranged to generate a beam, such as a laser beam LB, to be scanned over the surface of the optical disc OD to read from or write data to the optical disc OD. The optical pick-up unit OPU may be arranged to generate a write beam to write data and a read beam to read data from the optical disc OD, where the write and read beam may have different intensities.

The optical pick-up unit OPU is further arranged to move in a direction parallel to the surface of the optical disc OD, as indicated by the dashed arrows in horizontal direction according to FIG. 1. Also, the optical pick-up unit OPU may be arranged to move in a direction perpendicular to the surface of the optical disc OD to position the information layer of the optical disc OD in the focal plane of the laser beam LB.

The optical disc drive ODD further comprises at least one actuator, such as a rotation element R arranged to rotate the optical disc OD about a rotation axis RA. Also further actuators A may be provided to accurately position the optical disc OD and the laser beam LB with respect to each other. The term actuator is used to refer to all kinds of devices that are arranged to set things in motion, such as hydraulic systems, robot arms etc.

The movements as performed by both the optical pick-up unit OPU and the rotation element R are controlled by a control unit CU such that the laser beam LB scans the surface of the optical disc OD in an appropriate way, for instance following a spiral path.

The control unit CU may further be arranged to control the optical pick-up unit OPU to read or write data to or from the optical disc OD. In case of a write operation, the control unit CU may provide the optical pick-up unit OPU with the data that is to be written. In case of a read operation, the optical pick-up unit OPU may be arranged to transmit the data that is read from the optical disc OD to the control unit CU for further processing.

The control unit CU may comprise or have access to a memory ME. The memory ME may comprise programming lines that are readable and executable by the control unit CU to perform one or more of the embodiments presented here. The memory ME may also comprise data that is to be written on the optical disc OD. The memory ME may be of any suitable type, such as ROM, RAM, EPROM etc. So, according to an embodiment, a computer program is provided, when loaded on a computer arrangement, is arranged to perform any one of the embodiments described. Also, a data carrier may be provided, comprising such a computer program. The data carrier may be a medium arranged to comprise data, such as an optical disc, a CD, a DVD etc.

Position control For optical disc drives ODD the data is usually written in a spiral track. To keep the laser beam LB produced by the optical pick-up unit OPU on track and to stay in focus actuators may be provided to move the optical disc OD and the optical pick-up unit OPU with respect to each other to position the optical disc OD in focus of the laser beam LB and to position the optical disc OD and the laser beam LB in radial direction with respect to each other.

To control the movements of the actuators, position error signals may be derived from reflected laser light coming from the optical disc OD. The signal used to control the actuator displacements in radial direction is called the tracking error signal TE. The signal used to control the actuator displacements in focus direction is called the focus error signal FE. For stable tracking performance the tracking error signal TE and focus error signal FE must remain within certain predetermined limits.

In order to minimize the tracking error signal TE and focus error signal FE, a feedback loop may be provided.

Embodiments

It is noted that the embodiments described below may also be applicable to other memory types than optical discs OD, such as data storage drives etc. in which data can be written and verified.

According to the conventional "verify after write" functionality 100% of the data written to the disc is checked. The embodiments as presented here will provide a "verify after write" functionality which predicts and/or detects when data written to the disc is "endangered". Data that is not endangered is not verified, saving time and reducing the optical disc drive actions, such as stopping, going back, starting, reading etc. This technique will be referred to as the "fast verify after write" functionality.

So, there is provided a method of writing data to a disc (OD), the method comprising:

a) performing a plurality of writing actions in which a plurality of data portions are written to the disc, b) performing a plurality of verification actions in which written data portions are at least partly verified and at least part of the data portions are replaced if needed, wherein the method further comprises a2) performing a decision action for each writing action in which a decision whether or not to perform the verification action for a specific written data portion is taken.

In the text below, the writing actions may be referred to as actions a) and c), the verification actions may be referred to as actions b) and the decision actions may be referred to as actions a2). It will be understood that the actions as mentioned are not necessarily performed in this specific order.

So, according to an embodiment, there is provided a method of writing data to a disc (OD), the method comprising:

a) performing a writing action in which a first data portion is written to the disc, a2) deciding to perform b) or not, b) verifying at least part of the first data portion that is written to the disc and deciding to replace at least part of the first data portion that is written to the disc or not, and c) performing a further writing action in which a second data portion is written to the disc.

So, according to a further embodiment, there is provided a method of writing data to a disc (OD), the method comprising:

a) performing a writing action in which a first data portion is written to the disc, a2) deciding to perform an action b) or not for the first written data portion, and repeating actions a) and a2) for a plurality of further data portions, wherein action b) comprises:

b) verifying at least part of the respective data portion that is written to the disc and deciding to replace at least part of the respective data portion that is written to the disc or not.

Written data is considered endangered when the risk to have read back problems or data corruption is relatively high. Endangered data does not necessarily need to be replaced, but endangered data only indicates that the written data should be verified. Written data is not considered endangered when there is a relatively low risk that the data written to a disc cannot be read back.

The embodiments also provide the basic principle how to detect or predict when written data is endangered or not.

For the great majority of the discs only a very small part of the data will be endangered, so verifying written data will be done infrequently. The advantages are:

the performance decrease as a result of the "verify after write" functionality is reduced by applying the "fast verify after write" functionality;

there is no need for additional memory, thereby saving costs;

increase of lifetime of the optical disc drive because less actions and time are needed to record a disc.

The "fast verify after write" functionality will verify those written data portions that are endangered. Therefore, information is to be gathered based on which it can decided whether or not the written data is endangered or not, to prevent read back problems. How to predict this is discussed further below. For now, assume that such knowledge is present and is accessible for the control unit CU. This information may for instance be stored in the memory ME that is accessible by the control unit CU.

Flow Diagram 1

FIG. 2a schematically depicts a flow diagram as may be performed by the control unit CU according to an embodiment.

According to a first action 100, the control unit CU may start the write action, resulting in writing data to the optical disc OD in action 101. The control unit CU may be arranged to control the optical pick-up unit OPU and the actuators such that a first data portion, such as 30 ECC blocks, of the data to be written is written to the optical disc OD. After writing this first data portion, the control unit CU checks if verification is needed in action 102, i.e. if the data is considered endangered. This may for instance be decided on previously collected information. The previously collected information may be stored in memory ME that is accessible by the control unit CU.

If no verification is needed, the control unit CU may return to action 101 to write a next data portion of the data. It is noted that in the case no verification is needed, the write process is not interrupted for verification. So, no performance loss occurs because of the continuous writing process. If verification is needed, the control unit CU proceeds to action 103.

Action 103 may comprise reading back the written data and compare the written data to the data that was to be written. If a mismatch is found, the data may be replaced (see action 104).

However, additionally or alternatively, action 103 may comprise verifying the quality of the written data, instead of comparing the written data with the data that had to be written. The HF on the optical disc OD comprises much more information than just the data content. Examples of extra information available in the HF are jitter, asymmetry of the HF pattern, signal level of the HF, Bler, etc. (Bler is block error rate). For the quality check, it is not verified if the data matches the data that was initially intended to be written (comparing "0" and "1"), but other parameters are taken into account. For instance, if the HF that is read back from the optical disc OD shows a relatively high amount of asymmetry, the data is considered to have a low quality.

The quality of written data may also be verified using so-called error correction techniques. For instance, for Blu Ray optical discs 32 parity bits are used to correct a LDC word. There are 304 LDC words in 1 ECC. If too many errors in the LDC word occur, the parity bits available to correct these errors are not capable anymore to correct LDC, which leads to data corruption. If the parity bits are no longer able to correct these errors or if many parity bits are needed to correct the data, the quality of the written data may be considered to be too low.

If the quality of the written data doesn't fulfil predetermined quality requirements, the data may need to be replaced (see action 104).

So, action 103 may be performed by reading back the written data and compare it to the source data and/or performing quality measurements. With reference to the embodiment mentioned above comprising actions a1), a2) b) and c), action b) may comprise at least one of:

reading at least part of the first data portion that is written to the disc and compare it to data portion that was to be written, perform a quality measurement of the first data portion that is written to the disc and compare it to predetermined quality requirements. In 104 it is decided if replacement of the data is necessary or not.

The criteria to decide whether to verify the data or not (decision action a2)) may be different from the criteria to replace the data (verify action b)). Typically the criteria to decide whether or not to verify are more strict (more to the safer side).

In case no error is detected in the written data or the written data meets predetermined quality requirements, for instance comprising a margin that the written data should have, the control unit CU may return to action 101 to write a next data portion.

In case an error is detected in the written data (or quality that does not match the predetermined quality requirements, i.e. margin too low), the control unit CU may proceed with action 105, in which the written data is replaced at a different location on the optical disc.

According to an alternative, only a part of the written first data portion may be replaced, i.e. the part of the written data in which a mismatch was detected with the source data or part of the written data that does not meet the predetermined quality requirements.

After this, the control unit CU may return to action 101 to write a next portion of the data. It is noted that the control unit CU may also decide to replace data that does not have an error, but does not meet predetermined quality requirements, e.g. is written with a small margin, and is therefore replaced.

The replaced data is also verified if needed which again is decided in action 102. So, after action 105, the control unit CU returns to action 102. In fact, the control unit CU may be arranged such that action 102 always decides to verify replaced data.

Of course, the control unit CU ends performing the flow diagram as provided in FIG. 2a once there is no more data that is to be written.

FIG. 2b shows an alternative embodiment in which first a plurality or all of the data portions are written to the optical disc OD and verification if necessary is performed after all data portions are written. After each write action it is determined if verification is needed or not. If verification is needed, the data portion that is written is buffered in a memory to allow verification and possible replacement afterwards.

So, action 100, 101 and 102 are similar as described above.

If no verification is needed in action 102, it is determined if there is more data to be written in action 122. If so, the control unit CU returns to action 101.

If verification is needed in action 102, the control unit CU proceeds to action 121 in which the data portions and its location on the optical disc OD is buffered, i.e. stored in a memory. After this, the control unit CU proceeds with action 122.

Once in action 122 it is determined that no more data portions are to be written, the control unit CU proceeds to action 123 in which it is determined if there are any locations to verify in the memory (as a result of action 121). If so, these locations are verified and possible replaced in actions 103, 104, 105 (as described above), after which the control unit CU returns to action 123.

Once action 123 determines that there are no further data portions to be verified, the control unit CU is ready (action 134).

In the embodiments provided below several options and possibilities are provided that may be used by the control unit CU to decide in action 102 if verification is needed or not.

Embodiment 1

It is possible to reliable detect or predict when the data written to a disc is endangered or not. To understand this, first different causes why the data quality of an optical disc OD may change will be discussed. Next the method how to detect or predict endangered data will be discussed.

In general there are three causes that may negatively affect the quality of the written data:
1) optical disc properties,
2) optical disc drive properties, and
3) external events.

1) Optical Disc Properties

Because of tolerances of the production process, several properties will change over the optical disc OD. A typical example is the substrate (protective layer) thickness. These changing disc properties will influence the quality of the written data, but always in a gradual way. When a first data portion is written with a good quality on an optical disc OD at a certain position, a next data portion written on the next track will also be written with a good quality, here track is defined as the next full circle of the spiral groove. Or, more generally, writing close to the next track will also be written with a good quality. The definition of close is drive media dependent, but typically 0.5 mm is a good indication.

A different class of disc properties are disc defects. Large defects like dust on the substrate (protective layer) may change the disc properties gradually. Local defects like fingerprint, black dots, air bubbles or scratches may change the data quality abruptly from one position to a next, adjacent position or change gradually (both situations are possible for disc defects). Furthermore, local defects may make the radial or focus tracking performance unreliable.

2) Optical Disc Drive Properties

Similar to disc properties, optical disc drive properties may change gradually or abruptly.

Most of the optical disc drive ODD properties may change slowly as a function of time (temperature) or position. Typical examples of changing optical disc drive ODD properties are changing optical pick-up unit (OPU) properties as a function of temperature.

A typical fast changing optical disc drive ODD property may be the transition from read to write mode. When changing from reading to writing a lot of parameters, like laser power, may change abruptly.

For instance, a read/write transition can be dangerous because the laser power has to become correct within very small tolerances and in a relatively small time interval (often a feed forward is used). If this process goes very good then the next time there is also no problem. So, verifying the first read write transition gives an answer if other read/write transitions will be dangerous or not.

Also, the read/write signal can destroy the tracking error signal TE and focus error signal FE signals during some time. The effect will be always different (often disc position dependent) but this effect can be measured: monitoring the tracking error signal TE and focus error signal FE and defect size monitoring.

3) External Events

External event, like shocks, vibrations or drops in the power supply usually occur as a function of time and usually are not predictable.

Detection/Prediction of Endangered Data

An important aspect of the embodiments is the realization that changing properties or events may influence the quality of the data on the optical disc OD and hence the read back capability of the written data.

As a result of changing properties or events, the quality of the data on the disc may become such that even with the error correction present in optical discs, it is not possible to read out the data anymore.

The term error correction as used here refers to the error correction present in the disc format. For instance, for Blu Ray optical discs 32 parity bits are used to correct a LDC word. There are 304 LDC words in 1 ECC. If too many errors in the LDC word occur, the parity bits available to correct these errors are not capable anymore to correct LDC, which leads to data corruption.

During a write action, changing properties or events may also result in other errors like an off-track situation or a focus loss. These kinds of errors are mostly fatal looking to the ability to write the data correctly and read back the written data.

To check if written data is endangered or not endangered, several detection principles may be used, possibly in parallel to ensure better prediction/detection of endangered data. Next, a number of possible ways to detect and/or predict if written data is endangered or not are discussed. These ways may for instance be used in action 102 to decide if verification is needed.

Disc Zone Method

According to a first alternative, slow changing properties over the disc may be taken into account. According to this alternative the optical disc OD may be divided in a number of different zones. If at a certain moment the data written in a certain zone is not endangered than slow changing properties (for instance a changing temperature) cannot result in endangered data for this zone, within a certain time.

The zones are explained in further detail below with reference to FIG. 4.

Examples of slow changing properties are: quality of disc itself (e.g. substrate thickness variations), dust on the disc, temperature of different elements, such as the optical disc OD, the optical pick-up unit OPU etc.

Zones may be defined in dependence of the system (optical disc drive) and the application and may be based on knowledge (or an estimation) of how fast certain properties (such as temperature) change and the size of defect the system can handle.

Based on this information and other dependencies, the manufacturer of the optical disc drive may define the zone size. E.g. one zone starts from the inner data area and has a radius of 0.5 mm. A zone may be a complete rotation and a thickness (radius).

Other dependencies may be: how much time is the system allowed to check zones and how much memory contains is available. More zones result in more measurements (more time) and more information to be stored (more memory needed).

So, there is provided a method, wherein a plurality of zones is defined on the disc (OD) and a2) comprises:

checking if b) has already been performed for previously written data for the same zone as the first data portion and deciding not to perform b) if replacement of the previously written data was not necessary; or a2) comprises checking if b) has already been performed for previously written data for the same zone as the first data portion and deciding not to perform b) if the previously written data does meet some predetermined quality requirements. The predetermined quality requirements may comprise a margin for the written data.

The previously written data may be a single previously written data portion, or may be a predetermined number of previously written data portions.

Also, b) for the first data portion may only not be performed if b) was already performed for previously written data for the same zone as the first data portion within a predetermined time interval from performing a) for the first data portion.

This will be explained in more detail below.

Pre-Scan Method

To gain knowledge of the quality of the written data or to detect disc properties a scan of the disc may be made in advance of the writing process. This may also be referred to as a pre-scan. Based on the results of the pre-scan, areas of the disc may be defined and marked as areas in which "verify after write" functionality is to be performed.

Of course, such a pre-scan relatively takes a lot of time and therefore has a negative effect on the performance. However, in total the optical disc drive performs less actions (stop and return actions) compared to the above described "verify after write" functionality. Therefore, this approach increases the lifetime of the optical disc drive ODD. Also, the pre-scan may be performed when the optical disc drive ODD is idle, i.e. not in use.

Also, to limit the performance drop, it is possible not to pre-scan the complete disc, but only parts of the disc, for example one rotation in each zone (again, the zones being concentrically, ring-shaped zones).

This method may be used to measure the data quality of a certain zone. It may also be used to measure other disc properties like disc defects (fingerprints, scratches, black dots). The pre-scan method may also need a zone definition as described above.

So, there is provided a method wherein a2) comprises using information previously collected by performing a pre-scan of at least part of the disc (OD). Also, there is provided a method wherein a plurality of zones is defined on the disc (OD) and the pre-scan was performed for at least part of each zone. This will be explained in more detail below. According to an alternative, the method further comprises performing the pre-scan before performing action a).

The information from the pre-scan may further be used for other purposes.

For instance, pre-scan information obtained from the pre-scan about defects may be stored on the disc for later use, for instance for use in an action a2).

Also, the pre-scan information may be used to define the zones as used in the above described Disc Zone Method. In case the pre-scan reveals that a relatively many defects are present, the zones may be chosen relatively smaller and vice versa. Also, the size of the disc zones may vary over the optical disc OD depending on the amount of defects found in the pre-scan in different areas.

The pre-scan information may also be used to decide to pre-scan some areas of the optical disc OD in more detail.

The pre-scan information may further be used to predict a writing speed and/or an estimated total writing time. This information may be outputted to a user. However, this information may also be used to compute an adjusted writing speed. The adjusted writing speed can be computed by the control unit CU based on the pre-scan information. The adjusted writing speed may be computed by balancing two effects, i.e. adjusting the writing speed influences the writing time per data portion, and influences the amount of verifications and/or replacements that are to be performed. So, lowering the writing speed may result in a faster over-all writing time if it results in significantly less verifications and/or replacements to be executed.

So, according to an embodiment there is provided a method comprising performing a pre-scan of an optical disc (OD) resulting in pre-scan information and computing an adjusted writing speed using the pre-scan information for writing a plurality of data portions to the optical disc using a fast verify after write method.

Also, the adjusted writing speed and/or the corresponding adjusted estimated total writing time may be outputted to a user.

Monitor Function

According to a further functionality, a monitor function is applied to detect or to measure properties, which change in time. Examples of such properties are: external shocks, very local disc defects, changing temperature.

External shocks may be detected by providing a shock detector (accelerometer). When a shock is detected, the shock detector may transmit a signal to the control unit CU indicating that verification is required.

Changing temperatures may be detected using a thermometer. When a temperature change greater than a predetermined threshold is detected, the thermometer may transmit a signal to the control unit CU indicating that verification is required.

So, there is provided a method, wherein the a2) comprises performing a monitor function. The monitor function may comprise monitoring at least one of a tracking error signal (TE) or a focus error signal (FE),
monitoring shocks,
monitoring disc errors,
monitoring a temperature.

This will be explained in more detail below.

Anticipate Method

In some situations it is possible to know in advance that a certain write action will be more risky, i.e. that data written by a specific write action will be endangered because of the fact that it is written by a relatively risky writing action. For instance, data that is written by writing actions that are performed during or right after adjustment of the power of the laser beam generated by the optical pick-up unit OPU may be considered endangered.

Also, data that is written in the replacement area or other predetermined areas of the disc that are indicated as relatively worse (disc info) may be considered endangered.

Replacements are done in a certain disc area and the written data of one replacement is always limited (e.g. writing 1 ECC block). Because a replacement contains a lot of short ECC blocks and these blocks can be written during several sessions, it can be difficult to optimise an optical disc drive in this area. As an option, to be sure, data written in the replacement area could always be verified.

In a BD optical disc it is possible to indicate if a certain zone is reliable or not. If for some reason (other optical disc drive has written this, . . . ) it may be read out in the disc information that a zone is not reliable, resulting that all writing actions in this areas are always verified.

It is also possible that data of a certain type will be considered endangered, because it is relatively important data.

So, with the above mentioned techniques, a prediction can be made of what data will be endangered and what data will not be endangered.

So, there is provided a method, wherein a2) comprises checking if the first data portion is to be written on a certain location on the optical disc OD and not perform b) if so, and a method, wherein a2) comprises checking if the first data portion is of a certain type and not perform b) if so.

Of course, this method may be performed in the opposite way, wherein a2) comprises checking if the first data portion is to be written on a certain location on the optical disc OD and perform b) if so, and a method, wherein a2) comprises checking if the first data portion is of a certain type and perform b) if so.

This will be explained in more detail below.

Flow Diagram 2

FIG. 3 shows a possible implementation of a "fast verify after write" functionality and schematically depicts a flow diagram as may be performed by the control unit CU. When verify=TRUE, the written data will be verified. When verify=FALSE, the data is not verified. The control unit CU decides based on the flags TRUE and FALSE if the data is verified. The flags are only an indication if the data is endangered or not.

After a disc start-up, the optical disc OD is divided in a number of (imaginary) disc zones, e.g. concentric ring-shaped zones, as shown in FIG. 4. FIG. 4 schematically shows a top view of an optical disc OD divided in four disc zones Z1, Z2, Z3, Z4. It will be understood that any suitable number of disc zones Z1-Z4 may be chosen.

After start up, the quality of the optical disc OD is not known, so verify=TRUE for all disc zones Z1-Z4 and therefore all written data is to be verified. When a first portion of data is written in a zone, for instance the first zone Z1, the data is read back and verified. Based on the verification, it can be decided if the data in the whole zone is considered endangered or not. When the data is not endangered it is not needed to verify the data anymore in this zone.

There are many ways to decide if data is endangered or not. Of course, when an error is detected the data is considered endangered. However, a further check may be if the written data meets predetermined quality, e.g. if there is enough margin. Also, it is possible to predict if data will be good or not but this is limited: there will always be variations. These variations need to be significantly smaller than the margin measured.

A possible way to measure margins is for example using error statistics as will be understood by a skilled person. Also, other methods are possible, but the above described method is relatively good to measure margins because absolute properties are measured the limit when it goes wrong is known. In fact, it is possible to translate margins to actual measurements.

When the data is written to the optical disc OD and no verification is needed, a fast monitor loop is checking if no risk situation (like a local disc defect) occurred. If a risk situation is detected, the zone will be marked as an endangered zone. Now the data still available in the memory ME accessible for the control unit CU may be verified and the rest of the zone may be written and verified. In FIG. 3, the flow diagram starts with a start up action 200. After this start up action 200, all zones Z1-Z4 of the optical disc OD are set to verify=TRUE in action 201. In a next action 202 it is checked if for the current zone Z1 in which a write action is taking place, verify=TRUE or verify=FALSE. Possible, the control unit CU also verifies that a write action is taking place.

In case verify=FALSE, no verification is needed and the control unit CU may proceed with actions 203, 204 and 205. Because the monitoring function can be done during read or write, in action 203 it is checked if the write action is still on going. If a risk situation (action 204) is detected during write then (for this particular algorithm) this is a condition to mark the zone as endangered (action 206).

Also the monitoring loop may be a loop which normally doesn't know if the optical disc drive is reading or writing (it is just a fast polling loop). So, or the control unit CU has to stop the monitoring when switching to read mode or action 204 is needed (action 204 can always be done).

If so, action 204 may be performed in which it is checked if any risk situation has occurred. Action 204 may be decided using all kind of input based on one or more of the alternatives described. If no risk situation is present, the control unit CU may proceed with action 205 (the loop is a monitoring loop, so actions 203, 204 and 205 are checked very fast (e.g. every 22 micro seconds, no waiting in action 204) in which it is checked if the write action is still taking place with respect to the same zone Z1. If so, no verification is required and the control unit CU may return to action 203. Actions 203, 204 and 205 form a loop until no more data is to be written, or until a risk situation is detected and verification is required, or when a next zone is reached. In all these case the control unit CU returns to action 202.

If in action 202 it is determined that verification is needed because verify=TRUE, the control unit CU continues to actions 209-213.

The quality of the data is measured in action 209. In a next action 211 it is determined if the data is endangered or not.

If in action 211 it is determined that the written data is not endangered, the settings for this zone are changed: verify=FALSE in action 212, after which the control unit CU proceeds to action 202. If the data is considered endangered in action 211, the control unit CU proceeds with action 213 in which the data is verified and replaced if necessary and after that, returns to action 202 without changing the settings for this zone, so verify remains TRUE.

For the decision endangered or not (action 211) the written data is also analysed and the margins are measured. The margins for the decision zone endangered or not (action 211) may of course be larger then the margins for the decision replace data or not.

The above algorithm is an example of an implementation of the "fast verify after write" functionality. Of course, more complex algorithms are possible.

It will be understood that action 204 may be fed with information from the monitor function or the anticipate method described above, where actions 207-211 are mainly based on the disc zone method described above.

Embodiment 2

As described above, first scanning the optical disc OD to search for disc defects or disc errors may result in a performance drop. Furthermore unpredictable events like external shocks, undetected defects in the optical disc OD can immediately and unpredictably endanger the written data (already described in embodiment 1).

For this reason, embodiments are provided to robustly detect such a risk situation during a write action (i.e. detect endangered data). This embodiment deals with situations which are not predictable (already present in embodiment 1, see for instance action 204). It will be understood that this embodiment may be considered as a possible implementation of action 204 described above, but may also be an independent embodiment.

Two groups of unpredictable situations can be identified.
1) External Events
Typical examples of external events are external shocks. These events are not predictable and endanger the data that is written.

The data that is written will be endangered after an external shock because there is a possibility to get an off-track situation or a focus loss. It is also possible that tracking quality in focus and radial direction locally decreased a lot resulting in a deterioration of the data quality.

2) Undetected Disc Defects
During write it is possible to enter a disc defect. This may happen when a pre-scan didn't detect the defect or when no pre-scan is done.

The reasons why the written data will be endangered are the same reasons as above describe for external events. Additionally, a defect may also prevent the physical writing process in the disc. Typical examples of defects, which can prevent the writing process are air bubbles, scratches and black dots.

For external events and undetected disc defects the main reason why data will be endangered or not is the ability to stay on track or to stay in focus (this is especially the case for BD, for CD the latter is not true). This will be referred to as the tracking performance, both referring to the ability to stay on track and to stay in focus.

As described above, for stable tracking performance the tracking error signal TE and the focus error signal FE is to remain within certain limits. When the level of tracking error signal TE or the focus error signal FE exceeds a predetermined threshold value, this can be an indication that an unpredictable event occurred. It is not necessary to know which event occurred (external event or undetected disc defect) as this is not important. It is only important to detect the risk situation, which result in endangered written data. Monitoring the tracking error signal TE and/or the focus error signal FE may be done in many suitable ways. Here, a possible implementation is described. First, the tracking error signal TE and/or the focus error signal FE may pass a low pass filter, resulting in:

$FE_{LP}$=low pass filtered signal of focus error signal FE
$TE_{LP}$=low pass filtered signal of tracking error signal TE Threshold values to detect unstable tracking performance may be set: $FE_{lim}$ and $TE_{lim}$. When the low pass filtered signal of the tracking error signal TE or the focus error signal FE exceeds $TE_{lim}$ or $FE_{lim}$ respectively, then a risk situation occurred and the data is endangered. As a result, the written data may be verified (action 103).

So, the following monitoring loop may be repeated during writing data:

Read out $TE_{LP}$
If [abs($TE_{LP}$)>$TE_{lim}$] then send verify interrupt
Read out $FE_{LP}$
If [abs($FE_{LP}$)>$FE_{lim}$] then send verify interrupt
If verify interrupt received then immediately start verifying the written data.

The data which is just written before and during the detection has to be verified. This condition gives an indication how fast the reaction speed of the optical disc drive ODD is to be and how to control the memory ME of the optical disc drive ODD: the endangered data still needs to be accessible (for instance in the memory ME accessible by the optical disc drive ODD) to be able to verify the written data.

This monitoring loop must be executed fast enough to robustly detect the risk situations.

So, the monitoring loop may be used to provide input to the control unit CU to make a decision in action 102 (or e.g. action 204) as described above with reference to FIG. 2a. If at least one of the threshold values $FE_{lim}$, $TE_{lim}$ are exceeded, the control unit CU may decide that verification is needed and proceeds with actions 103, 104 and 105.

Monitoring Defect Detector
Monitoring the tracking error signal TE and the focus error signal FE to detect tracking performance problems works if these signals are reliable. Some disc defects may result in tracking performance problems, but may also destroy the tracking error signal TE and the focus error signal FE in such a way that the tracking error signal TE and the focus error signal FE are not usable anymore to detect tracking performance problems.

A typical example of this is a black dot. The black dot will (partly) block the laser light and as a result the tracking error signal TE and focus error signal FE signal level will become very small.

A black dot may be defined as follows: when looking to the mirror signal (=light or sum of diodes signals coming back from the optical disc) a black dot is an event, where the mirror signal level decreases significantly. A black dot is very locally and will repeat on subsequent disc rotations. Normally this is a not-reflective dot on the substrate of the optical disc. Examples of black dots are: black ink on optical discs, scratches (blocking the light), dust on the optical disc (many very small black dots, . . . ).

To be able to detect these kinds of risk situations another monitoring function is provided here that may be used during write actions.

Because of playability reasons, optical disc drives ODD already contain defect detectors for a long time. Defect detectors will detect when the tracking error signal TE or the focus error signal FE become unreliable. When it is detected that one or both of these signals TE, FE are unreliable, specific action is initiated to better stay on track or to better stay in focus.

The principle of the defect detector is relatively easy: a monitoring loop is checking for a drop in the mirror signal (using appropriate filters). When this drop is detected the defect signal is set high and special actions can be taken to improve the tracking performance.

This defect detector may be incorporated as part of the control unit CU, but may also be formed as a separate module (not shown in the Fig.'s). The defect detector can be used to monitor if there is a good tracking performance or not.

A large defect (such as black dot) may destroy the tracking performing. Here the defects are discussed, which are not detectable using the tracking error signal TE and the focus error signal FE signal but can be detected by the defect detector.

Therefore it is proposed to monitor the time the defect detector is detecting a defect and use this information to decide to verify data written in this time interval, or not. A single short black dot (defect detector event) e.g. 0.1 mm will not endanger the data and no verify needed even with detecting this small black dot. Detecting a single black dot of 1 mm, will endanger the data (high risk of off-track). So, the time the defect detector detects a defect is monitored, and when this time exceeds a predetermined time interval, the data written during this time interval is verified. If the time the defect detector detects a defect is below the threshold, no verification is needed, unless it is needed for an other reason (shock, pre-scan, etc.). So, information from the defect detector is used by the control unit CU to decide in for instance action 102 or 204 if verification is needed.

Also, a burst of small defects can destroy the tracking performance. It may be difficult to detect this risk situation using the tracking error signal TE and focus error signal FE signal. The monitor loop monitoring the tracking error signal TE and filter error signal FE will filter these signals to remove noise. When a burst of small defects are passing, the tracking error signal TE and/or the filter error signal FE may change rapidly from a correct signal level to a low signal level. Because of the filter, it may be difficult to detect bad tracking performance. This may be overcome by filtering the time a defect detector is detecting a defect.

The monitoring of the defect time as detected by the defect monitor may be implemented in many ways, one of them will be explained in more detail here.

Both large defects and a burst of (smaller) defects may be detected by low pass filtering the time a defect detector is detecting a defect $Defect_{time}$ So the time the defect detector detects a defect is filtered using a low pass filtered. The following parameters are identified:

$Defect_{LP}$=time, low pass filtered, that the defect detector detects a defect $Defect_{TH}$=threshold of the $Defect_{LP}$ signal to detect bad tracking performance The control unit CU may be arranged to perform a flow diagram to check if $Defect_{LP}$ exceeds the threshold $Defect_{TH}$ signal to decide if verification of the written data is required. The flow diagram is schematically depicted in FIG. 5.

Flow diagram 3

FIG. 5 schematically depicts a flow diagram as may be performed by the control unit CU. However, it may be understood that in case the defect detector is provided as a separate module, this flow diagram may be executed by such a separate module which communicates the outcome to the control unit CU when needed.

The control unit CU may start with a start action 300, after which the $Defect_{time}$ is determined detected based on the defect detector in action 301. For instance, the output of the defect detector is "defect" or "no defect" (high or low output). In a next action 302, the $Defect_{time}$ is filtered by a low pass filter, resulting in $Defect_{LP}$ In a next action 303, the filtered time $Defect_{LP}$ is compared to the threshold of the $Defect_{LP}$: $Defect_{TH}$.

If the filtered time $Defect_{LP}$ does not exceed the threshold $Defect_{TH}$, the control unit CU returns to action 301. If the filtered time $Defect_{LP}$ does exceed the threshold $Defect_{TH}$, the control unit CU decides that verification of the written data is necessary in action 304 and returns to action 301 after this.

The outcome of actions 303 and 304 may be used in action 102 described above with reference to FIG. 2 or in action 204 described with reference to FIG. 3.

In case the flow diagram is not performed by the control unit CU but for instance by the defect detector, action 304 may further comprise transmitting a message to the control unit CU that verification of the written data is needed.

The flow diagram as shown in FIG. 5 is to be executed fast enough to robustly detect error situations.

An advantage of this embodiment is that functionality may be used (defect detector) that may already be present in optical disc drives ODD.

For the "fast verify after write" functionality this monitoring function provides a warning signal indicating that data is endangered. In response to this, the writing process may be stopped in a controlled way (e.g. at the end of a ECC block) and the data is verified. If the data can be read back without any problem, the data will not be replaced.

According to this embodiment, a monitoring function is described using one or more of the tracking error signal TE, the focus error signal FE and the defect detector. Of course, also other suitable signals usable to detect bad tracking performance may be used, such as detecting wobble quality, the power needed to follow the track or to stay in focus, the power of the tracking error signal TE and/or the focus error signal FE etc.

Furthermore, also parameters that are not used for monitoring tracking performance may be used as an indication that data is endangered and verification is needed. Examples of such parameters may be: monitoring changes in the power supply, changes in the HF, wobble quality, etc. HF is the high frequent signal comprising the data as written on the disc. It is noted that it is not possible to read the written data quality during write but it is possible to analyse the high frequent information (again the light coming back from the disc) during write. The wobble quality refers to the quality of the wobble superimposed on the track to be used by the optical disc drive ODD to control the radial speed of the optical disc. For wobble there are a lot of possible methods to measure quality: amplitude changes, error correction (ADER), missed syncs . . . .

These remarks are just to indicate that one can use as monitor function whatever you want if the measurement is related to changing properties of optical disc OD or optical disc drive ODD.

Of course, also other monitors may be provided, such as for instance a temperature sensor that senses the temperature of for instance the optical disc OD, the optical disc drive ODD, the optical pick-up unit OPU etc.

So, based on this embodiment, parameters are monitored, based on which the control unit CU may decide if the data is endangered and verification is needed. Several parameters may be monitored, such as the tracking error signal TE, the focus error signal FE, the defect detector, the temperature.

Embodiment 3

According to this embodiment, a further principle to predict if written data will be endangered or not is provided. This embodiment is based on the insight that if data is written on a certain position on a certain moment in time on the optical disc OD with a relatively high quality, data that is written in the vicinity of that certain position within a predetermined time interval from that certain moment is not endangered and no verification is needed. This insight may be used in action 102 or action 211 to decide if verification is required or not.

To predict if it is possible to write not endangered data at a certain location on the disc, it is needed to know if the optical disc drive ODD can write on this position on the optical disc OD with a good data quality. Also, no big disc defects are allowed. It is possible to use previously written data to predict data quality and defect size.

Prediction Data Quality

Optical disc OD and optical disc drive ODD properties may change gradually. Most optical disc OD properties change as a function of position. Optical disc drive ODD properties will mostly change as a function of time (e.g. temperature).

When an optical disc drive ODD has written data with a good quality on the optical disc OD, new data that is written close to the already written data will also have a good data quality for which no verification is needed. An additional condition may be that the time between both write actions is not too long, i.e. the time interval does not exceed a predetermined threshold time interval. When the time between both write actions is below the threshold, the optical disc drive ODD and the properties of the optical disc OD cannot change much and the data will be written with a comparable quality.

In order to use this insight, the quality of data that is to be written on the optical disc OD is to be predicted. For this it is important to be able to measure data quality of data that has been written. Furthermore, it is important to know how fast properties of the optical disc drive ODD and the optical disc OD can change.

Data Quality

The HF on the optical disc OD comprises much more information than just the data content. Examples of extra information available in the HF are jitter, asymmetry of the HF pattern, signal level of the HF, Bler, etc. (Bler is block error rate).

So, when reading back the written data, it is not just verified if the data matches the data that was initially intended to be written (comparing "0" and "1"), but further parameters are taken into account as mentioned above. For instance, if the HF that is read back from the optical disc OD shows a relatively high amount of asymmetry, the data is considered to have a low quality.

As an example, for a BD disc every ECC block is divided into 304 LDC words, where an LDC-word is a long distance code word, which is parity protected.

The error correction has to be able to correct all errors in every LDC word using the available parities. A single uncorrectable LDC word is enough for data corruption. Because of the latter a very good measurement of the data quality, is the maximal number of parities needed to correct all LDC words. When enough margin is available (not all parities are needed) for all LDC words, the data has good quality.

Changing Disc Drive Properties

Properties of the optical disc drive ODD may change as a function of time and temperature. The effect of these parameters and the way to take these parameters into account is different for different optical disc drives ODD. Because temperature changes relatively slowly in time, a way to take this into account is by using the assumption that the prediction of data quality of data that is to be written on an optical disc OD, based on previously determined quality of previously written data, is only valid when the time between the previous and the current write actions is smaller than a predetermined threshold time interval.

The properties of an optical disc drive ODD may also change as a function of position of the laser beam on the optical disc OD. A way to take this into account is by using the assumption that the prediction of data quality of data that is to be written on an optical disc OD, based on previously determined quality of previously written data, is only valid when the distance between the previous and the current write actions is smaller than a predetermined threshold distance.

Measuring Defect Size

To measure the size of a defect on the optical disc OD, written data can be used. For instance, for a Blu ray Disc (BD), optical disc defects will locally destroy the data and the error correction (e.g. in case of BD by using BIS information) may correct the missing data. Based on sync/BIS (burst indicator signal) errata a maximum defect length can be estimated.

If a location has no or small defects then the defect size in a region around this location will also be acceptable. A typical dimension of this region is equal to half the radius of the maximal acceptable defect size. The maximal acceptable defect size is again drive and disc dependent.

So, when of a certain position it is determined that no defect is present, a circle surrounding that certain position will also be considered as a safe area, in which no defect occurs which can endanger the data. Based on this insight, the control unit CU may decide not to verify data that is written in this area, unless there are other reasons for doing so. To store already measured data (quality and defect size) a table may be stored in memory ME available. When the data of the written data is not endangered than the following information is stored: time of measurement, position of measurement. The table is a kind of FIFO buffer. New measurements will be added on the top of the list; too old measurement will be removed. This is done in order to take into account the requirement not too much time may have passed between determining the quality of data and using information from this to determine that data that is to be written in the vicinity of the data of which the quality has been checked does not need to be verified, i.e. is not endangered.

Flow Diagram 4

FIG. 6 schematically depicts a flow diagram as may be performed by the control unit CU to implement the embodiment presented here. The flow diagram may be used as an alternative for the flow diagram presented in FIG. 2a. Also, a variation to this flow diagram may be used by the control unit CU to decide if verification is needed in action 102 or action 204 of the flow diagrams depicted in FIGS. 2, 3

The flow diagram starts with a start action 400, after which the control unit CU receives a write command in action 401. The write command comprises a start address W and a stop address S1. Thus, data is to be written in between the start address W and the write address S1.

In a next action 402, the radius of the optical disc OD is calculated corresponding to these addresses (start radius, stop radius). In this embodiment, already written data is used to predict the quality of the data close to this data. A way to do this is to translate close to a certain position and distance (mm). The relation between data and position is radius dependent. So the radii are used in action 403. However, it will be understood that this is just a possible way to do this.

In action 403 it is calculated until what address the control unit CU can write data that is not endangered. This is done by checking the table stored in memory ME. Based on the table, it is computed if the intended write addresses are not too close to a previously determined defect (for instance by converting addresses to radii). Also it is checked if the intended addresses of the intended write action are not too far removed from locations where previously data has been written with a good quality and if not too much time has lapsed.

The outcome of action 403 is an address (no_verify_stop), which indicates how much data is not endangered. Up to this location the write process won't be endangered. When even the start address is endangered, then no_verify_stop has the same value as the start radius. When the complete area which has to be written is not endangered, the value of no_verify_stop will be equal or larger then the location of the stop_address S1.

Based on the outcome of action 403, in action 404 the data range (from W to S2), which can be written continuously (i.e. without verification) can be calculated. In action 404 the stop position of the current write action is calculated and made equal to S2. S2 is the stop position of the current write action. S1 is the stop position of the write action defined in 401 (to reach this stop position is may be possible to do several write and verify actions).

In actions 405 the data is written in between start address W and stop address S2. Action 406 checks if the write action is finished (i.e. if stop address S2 has been reached). If so, the control unit CU proceeds with action 407 in which it is checked if stop address S2 is equal to the initial stop address S1. If not, the control unit CU returns to action 403, in the meantime setting the start address W at the previous stop address S2 in action 408.

If action 407 results in a no, then the final stop address is not reached and the last written data is considered endangered and will be verified. Therefore, in action 409, the last N number of ECC blocks are verified and the quality of them is checked. The verification may for instance be performed according to actions 103-105 described above. At the same time, the quality of the last N ECC blocks is measured and information about the quality is stored in the table in memory ME.

If in action 407 it is determined that the stop address S2 is equal to (or larger than) the initially intended stop address S1, this means that the write action is finished. If that is the case, the control unit CU proceeds to action 411 in which, similar to action 409, the last N ECC blocks are verified, the quality thereof is checked and the table in memory ME is updated based on the outcome of the quality check. Of course, when the radius associated with S2 is not endangered, action 411 can be omitted. This is checked in action 410. After action 411, the write command received in action 401 is finished (action 412). This embodiment is reading back data and retrieving the information from the HF. Of course, this embodiment may be used in combination with other embodiments, for instance using: defect detectors, tracking stability, measuring temperature, wobble, . . . .

So, there is provided a method, wherein a2) comprises checking if b) has already been performed for previously written data within a predetermined distance from the position on the disc where the first data portion is to be written, and not perform b) if no replacement was necessary of the previously written data.

Furthermore there is provided a method, wherein a2) comprises checking if b) has already been performed for previously written data within a predetermined distance from the position on the disc where the first data portion is to be written, and deciding to not perform b) if the previously written data does meet some predetermined quality requirements. The predetermined quality requirements may comprise a margin for the written data.

Embodiment 4

According to a further embodiment, a further principle to predict if written data will be endangered or not is provided. According to this embodiment, the control unit CU may decide whether or not to verify written data based on the content of the written data and or the intended position (address) of the written data. This embodiment is based on the insight that some data parts are more critical than other data parts, such as:

1. File system areas,
2. Spare areas,
3. Defect tables,
4. Addresses located in neighborhood of previous defects, (already described in other embodiments)
5. Addresses located in neighborhood of address which are located in the defect table as defect or possible defect,
6. Record start address (Often the first ECC block written on an optical disc OD can be risky because the laser power has to switch very fast from read to the correct write power. During this transient the data can be endangered (depends of drive/disc). A possible solution is to always keep the first ECC block written to the optical disc OD in the memory ME of the optical disc drive ODD. At the end of the write action of e.g. a not endangered area only the first ECC block can be verified and replaced if needed.),
7. Areas which are accessed frequently (The control unit CU may have a kind of learning mechanism by keeping a list of frequently accessed addresses and consider this list as endangered data. Data that is accessed frequently is mostly "important" data (e.g. file system data)),
8. Addresses found suspicious during read or pre-scan (amount retries, error rate, uncorrectable count, etc. In case there is read access to the optical disc OD, information can be gathered about disc status. This information can be used to decide whether parts of disc are to be considered as endangered. Information can be stored in the memory of the control unit CU, or can be stored on the optical disc OD. One step further, the control unit CU may decide to replace data that is found suspicious during read (replacements during read), 9. Areas that are found during scanning of the disc (see embodiment 5),
10. Areas indicated as being important, for instance by a user.

Items 1, 2, 3 relate to the data content which may be considered to be of such importance that verification is always required. Items 4, 5, 6, 7, 8, 9 and 10 relate to write actions on certain specific addresses that are considered more vulnerable to errors and are therefore considered endangered.

If one of these areas is not readable anymore (because of defects) the optical disc OD may be assumed as unusable or corrupt. When the optical disc drive ODD needs to write these areas, the control unit CU can always decide to verify this data after they have been written.

According to this embodiment, the host application or the optical disc drive ODD may decide that verification is needed. The host application may for instance be the application sending instructions to the control unit CU to initiate the write process.

The host application sends normal write commands for data areas (normally not endangered data, so no verification is required). When the area is more critical (file system area, user indicates important information) the write command may indicate that verification is required. So, the write commands as received by the control unit CU may already comprise an indication that certain data always needs verification after writing.

Also the optical disc drive may decide that verification is required. The optical disc drive ODD may do so based on the addresses where the data is to be written on the optical disc OD. Some addresses are known to be critical. Information about this may be stored in the memory ME accessible by the control unit CU. For the optical disc drive spare areas, defect tables and other critical areas are stored in the memory ME.

Embodiment 5

According to a further embodiment, the optical disc OD is divided in a number of (imaginary) disc zones, e.g. concentric ring-shaped zones, as already shown in FIG. 4. FIG. 4 schematically shows a top view of an optical disc OD divided in four disc zones Z1, Z2, Z3, Z4. It will be understood that any suitable number of disc zones Z1-Z4 may be chosen.

This embodiment provides high reliability without necessarily verifying the whole optical disc OD. At the same time, this embodiment is faster than an algorithm verifying the whole optical disc OD.

For achieving this, all kind of information of the optical disc OD may be collected. This information may be used to determine defects of the optical disc OD. The information may be used by the control unit CU to decide if verification is needed or not (for instance in action 102 or 204 described above).

For performing this embodiment, the optical disc OD is divided in a number of zones Z1-Z4. The size of the zones Z1-Z4 may be chosen such that it can handle a defect, which can be encountered in normal use.

Assume that a defect is substantially round and a pre-scan is done in the middle of a zone (i.e. along a circle running through the middle of the zone), than the size of the zone can be almost the same size of a maximum allowed defect. Better is of course to make it a little smaller to increase margin (decrease risk). If a measurement is done along the middle of a zone and no risky defects are measured, than an area between "measured position-(size allowed defect/2)" and "measured position+(size allowed defect/2)" is assumed to be all right.

If the measurement is done in the beginning of the zone (so not in the middle) (see below) than the zone size should be smaller than "size allowed defect/2".

In a next action, the control unit CU may initiate that for each zone Z1-Z4 the first few blocks are verified after data is written. When a defect is found in this first few blocks, all blocks in that specific zone will be verified. If no defect is found in this first few blocks, no verification will be done in this zone (except of course when verification appears to be necessary for another reason).

According to this embodiment, each zone is categorized as being UNKNOWN, CLEAN or SUSPICIOUS. Each zone Z1-Z4 of an optical disc OD will first be categorized as UNKNOWN.

It is to be noted that this embodiment can perform a pre-scan for zones in advance, so also when no writing action is performed, a pre-scan can be performed for zones that are unwritten, i.e. no writing actions have been performed for these zones. When a first block of data is written to the optical disc OD the optical disc drive ODD checks the state of the zone Z1-Z4 where the first block of data is written. If the zone is UNKNOWN the optical discs drive ODD needs to scan or verify the written data. This may be similar to actions 209, 211 and 212 of FIG. 3.

If the state is SUSPICIOUS the optical disc drive ODD verifies the written data. If the state is CLEAN, this means data has previously been written in this zone without any problem or the zone was scanned before any writing action was performed with respect to this zone without revealing any defects. Therefore, no verification is needed anymore.

So according to this embodiment, the way the state of the zone Z1-Z4 is determined is left open. The state of a zone Z1-Z4 may be determined by scanning a zone Z1-Z4 beforehand (before the first writing action with respect to the zone Z1-Z4) or by verifying data that has just been written to the particular zone Z1-Z4. Of course, also other ways may be conceived, such as a test write action.

Remark: In this embodiment often defect is used to indicate endangered data. The scanning algorithm monitors all kind of information, which may be useful to indicate defects or in general endangered data in this specific zone Z1-Z4 of the optical disc OD. The length of scanning is smaller then the whole zone Z1-Z4 and large enough to detect the smallest defect. If this scan discovers defects or marginal areas or endangered data, it will update the zone status where its located as being SUSPICIOUS and a verify action will follow.

If the optical disc drive ODD is not busy for some time, the optical disc drive ODD can make the decision to scan the optical disc OD before any write action is received or is planned to be performed. Based on the outcome of the scan, the zone tables stored in memory ME may be updated and may be used by future write operations.

This scan must detect all kind of defects on written or unwritten areas using all kinds of information to judge if an area is possibly bad.

The zone tables may also be updated during writing or reading of the optical disc OD. When writing or reading the optical disc drive ODD may also measure all kinds of information, which can be an indication of future defects.

When one of these areas is discovered, the control unit CU may update the zone tables, which will mean a verify action follows for all blocks which are written in this zone.

According to a further aspect, the zone tables may be stored on the optical disc OD itself before removing the optical disc OD from the optical disc drive ODD. The zone tables may be taken from the memory ME and be written on the optical disc OD, for instance on a special dedicated position on the optical disc OD. If the optical disc OD is put in an optical disc drive ODD for further write actions, the optical disc drive ODD may read and use the zone tables from the optical disc OD and use them during the coming write actions. This way, the zone tables can immediately be updated and no information is lost.

Embodiment 6

The problem with rewritable discs is that the quality of written data can change very abrupt because of DOW (Direct Over Write) problems. Extremely one data block can have very good margins, a next data block can not be read anymore. As a consequence it can be very difficult to predict the data quality based on measuring previously written data. Write modes like fast verify after write can sometimes not detect corrupt data blocks. This embodiment provides a solution to detect if potential DOW problems are present and takes action to reduce the risk significantly that un-correctable data is present on the disc.

According to an embodiment the decision action comprises a DOW-analysing action using so-called DOW-information.

As will be known to a skilled person, in case of re-writeable optical discs OD, the quality of the written data varies for each subsequent time a particular area of the optical disc is written on. Each subsequent time data is written on a particular area of the optical disc the quality can decrease, so the quality of the fourth time a disc area is rewritten (DOW4) is in general a bit lower than the quality of the third time a disc area is rewritten (DOW3). However, the quality of DOW1 (the first overwrite) is usually an exception to this gradual decrease of quality and is usually of much lower quality than DOW0 and DOW2. FIG. 7a provides a DOW-curve showing the BLER (Block Error Rate) of written data for different values of DOW.

The margin is a proportional measure for the quality. The exact shape and value of the DOW-curve may differ for different optical discs. The margin may for instance be expressed as an amount of parity bits not used to correct a LDC words.

Based on the above it can be understood that two types of DOW problems can be identified:

Group 1: for optical disc, DOW 0, 1 and 2 may result in very different data quality. Typically the quality of DOW1 data, will be worse than the quality of DOW0 or DOW2 data; and Group 2: when writing many times at a certain location the data quality will degrade as a function of the DOW number (number of over-writes). Typically after a few thousand write actions the data quality will become marginal.

It is noted that it is not a solution to just increase the data quality margin of already written data for rewritable discs. Taking too much margin will result in very bad performance looking to writing speed, furthermore it is possible to have very good data and next very bad data.

So, the decision action (action a2, action 102) may comprise a DOW-analysing action.

According to an embodiment, the DOW-analysing action may comprise determining if a write action will experience possible DOW1 problems, and if so, the decision action may decide to adjust the data quality margins.

According to an embodiment, the DOW-analysing action may first comprise analysing the DOW-curve for a particular optical disc, for instance by performing a number of write and re-write actions (e.g. on non-written areas of the disc) and measure the quality of the written data in between successive write and re-write actions to get an estimate of the DOW-curve. If the quality difference between DOW0 and DOW1 is below a predetermined threshold the decision action may decide to adjust the data quality margins and as a result, may always decide to perform the verification action for future write actions. If the quality difference between DOW0 and DOW1 is above the predetermined threshold the decision action may decide to not adjust the data quality margins and as a result may decide not to perform the verification action for future write actions, unless required for other reasons (such as defects, temperature changes, shocks). This embodiment is also further explained below with reference to FIG. 8 (action 803).

According to an alternative, the DOW-curve may be analysed by using differences in quality (or margins) between adjacent clusters to get idea about DOW problems. This alternative doesn't require separate write and re-write actions. If the differences are too big, DOW problems may occur when using fast verify after write techniques.

According to a further embodiment, the DOW-analysing action may comprise setting each zone (Z1, . . . , Z4) to UNKNOWN or SUSPICIOUS after performing a DOW0 write action (see embodiment 5).

According to a further embodiment, the DOW-analysing action performs a pre-scan of the disc and measures the data quality of previously written data. If there are too large differences this may cause problems when performing the fast verify after write embodiments described above.

This will be explained by an example:

Example 1

A BDRE disc, used in a certain optical drive has a DOW performance shown in 7b. Currently the data zone of the optical disc OD contains DOW 100 and DOW 1000 data. The DOW 100 and DOW 1000 data is spread over the data zone of the optical disc OD.

For this implementation the data quality margin is set to 20 not used parities bits for a LDC word. So, when data is measured and the maximum used parity bytes of a LDC word is larger than 34−20=14 (see default margin FIG. 7b) the fast verify after write algorithm may verify all the written data in this zone.

For DOW algorithm, the allowable margin difference=6 (same units as above).

In case there is no DOW analysing action implemented, the following situation may occur when writing data to the disc using the fast verify after write functionality:

2000 ECC block are to be written to the optical disc OD and all these blocks will be located in the same zone. The first 1200 ECC blocks have DOW 100, the last 800 ECC blocks have DOW 1000. First 30ECC block are written to the disc and the write process is stopped. The data quality of these 30 ECC block is measured. The maximum used parity bytes of the LDC words is equal to 10. This corresponds to a margin of 24 (=34−10), which is larger than 20, so it can be decided that the rest of the ECC blocks are written without verification. So, for the rest of the ECC blocks the decision action will decide that no verification action is necessary based on the good quality of the first 30 ECC blocks. So, the rest of the 1970 ECC block are written and not verified.

If the data is read back later by a user, the first 1200 blocks can be read back very well. The margins to read out the data vary between e.g. 34 and e.g. 22 (units: 34-maximum used parity bytes of the LDC words). However, the last 800 ECC block (DOW 1000) are very difficult to read back. There is almost no margin: less than 2. For example ECC block 1987 and 1988 can not be read back anymore.

In order to prevent the scenario described above, the DOW analyzing action may be performed as described below with reference to FIG. 8. The outcome of the flow diagram presented in FIG. 8 may be used later on for performing the decision action. The outcome of the flow diagram may thus by used to adapt the fast verify after write technique to handle possible DOW problems.

The DOW analyzing action may comprise scanning the disc (partially or completely) to detect DOW problems in time. Adding some extra intelligence to the scanning algorithm can solve this problem. These problems may occur at locations with the highest DOW, or at locations with DOW1 problems or in areas where data is written with not optimal power, such as OPC area, File system area, Defect table area, Start data area.

Scanning the risky disc areas may provide information how to change the data quality margins used in the fast verify after write techniques or may provide information to change scan algorithm (more/less detail scans at certain area).

The flow diagram may be performed by the control unit CU.

The flow diagram starts with action 800.

First, in action 801 it is tested if the disc OD is a new disc or not. Several methods can be used to detect if the current disc is a new disc and as a consequence of there will be data on the disc or not. Possible ways to check if the disc OD is a new disc or not are: checking if defect table is available, check if HF available in OPC area, etc. If the disc OD is new, no DOW problems are to be expected (neither group 1 or group 2 problems) and the flow diagram proceeds with action 806.

If the disc OD is not new, action 802 may be performed in which the area to be written is scanned. Ideally the disc OD is scanned completely in idle time. If this is not possible a fast scan can be done. An example of a fast scan is to scan some data blocks in the middle, centre and end of a zone. During the scan typically the following data is collected for scanned data blocks: data available (yes/no), data quality.

Next, action 803 may be performed as an option. Action 803 comprises of actions 804*a*, 804*b* and 805 and may be performed to identify possible group 1 DOW problems. For instance, action 803 may only be performed when there is a high risk for group 1 DOW problems.

First in action 804*a* it is determined if there are areas available on the disc OD that have never been written. If such areas are not available, action 803 can not be completed and the flow diagram proceeds with action 805. If however areas that have not been written are available (no HF available), action 805 can be performed, being a DOW0 and DOW1 test performed in action 804*b*.

First, data will be written (DOW0) and analysed. Next the same data block(s) will be overwritten (DOW1) and again the data will be analysed. A possible DOW1 problem can be detected by comparing the data quality of the DOW0 and DOW1 test write. This information can be used to adjust the data quality margins.

Action 803 in combination with action 805 may be summarized as follows performing a first test write action to write a first test data portion on an area on the disc (OD) that has not been written before determine test quality of the written first test data portion, performing a second test write action to write a second test data portion overwriting the first test data portion determine test quality of the written second test data portion, determine test difference between determined test qualities, wherein the decision action decides to perform the verification action if the test difference is above a predetermined threshold.

It will be understood that action 803 may be applied as a separate embodiment, i.e. without applying action 802.

Next action 805 comprises calculation of the margins and based on that, it can be decided if there are possible DOW problems. Typically the data quality of the measured data blocks will be compared and if there is a too large difference in data quality, this indicates there are possibly DOW problems on this disc.

This information can be used to adjust the necessary data quality margins used in the FVAW mode.

Please note that if the data quality margins need to become very large this will effectively result in verifying all the newly written data.

Action 802 in combination with action 805 may be summarized as follows performing a scan of at least parts of the optical disc to determine quality of data previously written to the optical disc (OD), compute difference between determined qualities the decision action decides to perform the verification action is the difference is above a predetermined threshold.

It will be understood that action 802 may be applied as a separate embodiment, i.e. without applying action 803.

Example 2

To show the effect of applying this embodiment, a further example is provided. 2000 ECC block are to be written to the disc OD and all these blocks will be located in the same zone. The first 1200 ECC blocks have DOW 100, the last 800 ECC blocks have DOW 1000. So, this disc OD is not a new disc (action 801).

Before writing data to the disc a fast scan (action 802) of the zone is performed (one rotation begin, middle and end of zone): resulting in highest margin of 34−10=24 and lowest margin 34−32=2.

Action 803 is omitted in this example.

In action 805 the following is computed:

margin difference=24−2=22, evaluation margin 22 is larger than allowable quality difference=6, thus adjust data quality margin, adjustment data quality margins=20+(22−6)=36.

As a result, the first 30 ECC blocks are written to the disc and the write process is stopped. The data quality of these 30 ECC block is measured. The maximum used parity bytes of the LDC words is equal to 10. Calculation is done if rest of data is to be verified: margin=34−10=20. This is smaller than 36 (new data quality margin), so the rest of the data will be verified.

The rest of the 1970 ECC block are written in blocks of 30 ECC blocks and verified. Blocks 1582, 1688, 1788, 1987 and 1988 are replaced because they can not read back or the criterion to replace data was met.

In comparison with the previous Example 1 it is noted that blocks 1582, 1688 and 1788 were replaced because the data quality margins of these blocks were below the replacement criteria. Blocks 1987 and 1988 were replaced and are now readable in contrast to Example 1 in which they were not replaced and therefore not readable.

When reading back the data at a later time, the first 1200 blocks can be read back very well. The margins to read out the data vary between 34 and 22 (units: maximum used parity bytes of the LDC words). The last 800 ECC block (DOW 1000) are more difficult to read (but still readable). Blocks 1582, 1688, 1788,87 and 1988 are located in the data replacement area. This it can be seen that all data can be read back. The DOW problem was detected and overcome.

Embodiments are provided that allow the control unit CU to decide if verification is needed or not. If no verification is needed, the write action may continue writing a next portion of data, skipping (not performing) verification of the previously written data. As an alternative it was described that a plurality of data portions are written and for each data portion it is determined if later verification is needed or not. The data portions for which verification is needed are verified after the plurality of data portions are written.

The following approaches were discussed that may be used to provided the control unit CU with information based on which it may decide if verification is needed.

A disc zone method is described, wherein the optical disc OD is divided in a number of zones, and for each zone it is determined whether or not verification is needed. Data that is written in a zone is verified and/or the quality of the written data is determined, and based on that it is decided if verification of further data written in the same zone is necessary. According to an embodiment an additional parameter time is considered, to take into account gradually changing parameters, such as changing temperature. According to such an embodiment, after a certain period of time from verification and/or data quality determination, verification and/or data quality determination needs to performed again.

According to a further embodiment, a pre-scan is performed of the optical disc OD before actually performing writing actions. Based on the outcome of the pre-scan, it is determined where data can be written on the optical disc OD with and without verification.

Also, a combination of the disc zone embodiment and the pre-scan embodiment may be employed. For instance, a pre-scan may be performed for a small part of each zone of the optical disc OD, based on which it is decided if verification is needed or not for the respective disc zones.

According to a further embodiment, during writing actions information may be collected about defects of the optical disc OD and the data quality of the written data. This information may be used to decide that no verification is needed in a certain area around the current write position or within in a certain period of time from the current write action.

According to a further embodiment, parameters may be monitored during a write action, based on which it may be decided if verification is needed or not. For instance, the temperature may be monitored and/or shocks may be detected. When a temperature change is detected and/or a shock is detected, this may be used as input for the control unit CU to decide that verification is needed.

According to a further embodiment, the control unit CU may have knowledge about certain locations on the optical disc OD and/or certain type of data that for which write actions always need to be verified. Certain areas on the optical disc OD are known to be vulnerable to writing errors. Also, certain data is considered so important that verification is always needed.

Of course, combinations of the above described embodiments may be used and put to practice.

Further Remarks

As a variation to the above embodiments, the following embodiments are provided:

According to an embodiment there is provided a method of writing data to a disc (OD), the method comprising:
  a) performing a writing action in which a first data portion is written to the disc, a2) deciding to perform b) or not,
  b) verifying at least part of the first data portion that is written to the disc and deciding to replace the first data portion that is written to the disc or not, and
  c) performing a further writing action in which a second data portion is written to the disc.

According to an embodiment there is provided a method wherein a2) comprises checking if the first data portion is to be written on a certain location on the optical disc OD and not perform b) if so.

According to an embodiment there is provided a method wherein a2) comprises checking if the first data portion is of a certain type and not perform
  b) if so.

According to an embodiment there is provided a disc drive arranged to receive a disc, the disc drive comprising an optical pick-up unit (OPU), arranged to generate a beam to be scanned over the surface of the disc (OD) to read data from or write data to the disc (OD), the disc drive arranged to
  a) perform a writing action in which a first data portion is written to the disc,
  a2) decide to perform b) or not,
  b) verify at least part of the first data portion that is written to the disc and decide to replace the first data portion that is written to the disc or not, and
  c) perform a further writing action in which a second data portion is written to the disc.

The embodiments provided here are all explained with reference to optical discs OD, such as BD, HD-DVD, DVD, DVD-RAM, CD drives. However, it will be understood that the embodiments may also be applicable to other memory types, such as data storage drives etc. in which data can be written and verified. In general, the embodiments may all be applicable to any kind of arrangement for writing data to a memory type.

The descriptions above are intended to be illustrative, not limiting. Thus, it will be apparent to one skilled in the art that modifications may be made to the invention as described without departing from the scope of the claims set out below.

The invention claimed is:

1. Method of writing data to a disc, the method comprising:
  a) performing a plurality of writing actions in which a plurality of data portions are written to the disc,
  b) performing a plurality of verification actions in which written data portions are at least partly verified and at least part of the written data portions are replaced if needed, wherein the verification action for the written data portion is not performed if the verification action was already performed for a previously written data portion for a same zone as the written data portion within a predetermined time interval from performing the write action for the written data portion,
  wherein the method further comprises
  a2) performing a decision action for each writing action in which a decision whether or not to perform the verification action for a specific written data portion is taken.

2. Disc drive arranged to receive a disc, the disc drive comprising an optical pick-up unit, arranged to generate a beam to be scanned over the surface of the disc to read data from or write data to the disc, the disc drive arranged to
  a) perform a plurality of writing actions in which a plurality of data portions are written to the disc,
  b) perform a plurality of verification actions in which written data portions are at least partly verified and at least part of the data portions are replaced if needed, wherein the verification action for the written data portion is not performed if the verification action was already performed for a previously written data portion for a same zone as the written data portion within a predetermined time interval from performing the write action for the written data portion,
  wherein the disc drive further is arranged to
  a2) perform a decision action for each writing action in which a decision whether or not to perform the verification action for a specific written data portion is taken.

* * * * *